United States Patent
Borrill

(10) Patent No.: US 6,496,922 B1
(45) Date of Patent: *Dec. 17, 2002

(54) METHOD AND APPARATUS FOR MULTIPLATFORM STATELESS INSTRUCTION SET ARCHITECTURE (ISA) USING ISA TAGS ON-THE-FLY INSTRUCTION TRANSLATION

(75) Inventor: Paul Borrill, Cupertino, CA (US)

(73) Assignee: Sun Microsystems, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/332,005

(22) Filed: Oct. 31, 1994

(51) Int. Cl.[7] .................................................. G06F 9/34
(52) U.S. Cl. ............................ 712/209; 712/210; 711/3
(58) Field of Search ................................ 395/821, 403, 395/375, 650, 385, 386; 380/4; 711/3; 712/209, 210

(56) References Cited

U.S. PATENT DOCUMENTS 3,997,895 A * 12/1976 Cassonnet et al. .......... 395/500

(List continued on next page.)

FOREIGN PATENT DOCUMENTS

| EP | 0 150 521 A3 | 8/1985 |
| EP | 0 199 173 A3 | 10/1986 |

OTHER PUBLICATIONS

N. Drescher, A New Microarchitecture Based on a Risc Like Structure But With a Cisc Like Instruction Set, Microprocessing and Microprogramming, vol. 25, No. 1/5, Jan. 1989, pp. 121–125.

(List continued on next page.)

Primary Examiner—Richard L. Ellis
Assistant Examiner—Gautam R. Patel

(74) Attorney, Agent, or Firm—Blakely Sokoloff Taylor & Zafman

(57) ABSTRACT

A method and apparatus for providing a stateless multiplatform instruction set architecture (ISA) for use in a computer system having a processor and memory storing a control program for implementing the invention. The system is used to statelessly execute instructions authored to correspond to a variety of different ISA's on a unitary platform. The ISA of the invention uses a very long instruction word (VLIW) architecture with 64-bit instructions, of which several high-order bits are reserved for an ISA identifier tag. When the processor receives an instruction for execution, it inspects the instruction to determine from the ISA identifier tag to which original, native ISA the instruction corresponds. If the corresponding ISA is the native VLIW ISA for the processor, then the instruction is routed to the instruction dispatch unit of the processor, and thence to at least one functional unit for execution. If the corresponding ISA is not the native VLIW ISA, then the instruction is routed to one of a plurality of dynamic decode units (DDU's), each DDU being controlled by a translation routine that translates the instructions from a non-native ISA to the native VLIW ISA. The translated instructions are then sent to the instruction dispatch unit, and on to the appropriate functional unit(s). Any instruction that includes unused bits, such as 64 bit instructions with free higher-order bits, can accommodate the ISA identifier tag by simply using the unused bits. Instructions that do not include unused bits, such as 32-bit instructions for non-VLIW architectures (e.g. the ISA's for SPARC, PowerPC or x86), are appended with additional bits to bring the total to 64 bits, several of which are reserved for the ISA tag. The number of bits reserved for the ISA tag determines the number of non-native ISA's that are recognized by the system; e.g., three bits allows for the native ISA plus seven non-native ISA's to be recognized by the system. Incoming instructions corresponding to a non-native ISA for which no dynamic decode unit is available can be executed by conventional software emulation. Entire programs written for non-native ISA's (using, e.g., 32-bit instructions) can be converted to the format for the native VLIW ISA by appending, at the instruction loading stage or in a separate process independent of execution, the additional bits necessary both to fill out the instruction word lengths and to include the ISA identifier tag bits.

26 Claims, 6 Drawing Sheets

U.S. PATENT DOCUMENTS

| | | | | |
|---|---|---|---|---|
| 4,415,969 A | * | 11/1983 | Bayliss et al. | 712/227 |
| 4,839,797 A | * | 6/1989 | Katori et al. | 395/375 |
| 5,115,500 A | * | 5/1992 | Larsen | 395/375 |
| 5,313,614 A | * | 5/1994 | Goettelmann et al. | 395/500 |
| 5,438,668 A | * | 8/1995 | Coon et al. | 712/204 |
| 5,598,546 A | * | 1/1997 | Blomgren | 712/209 |

OTHER PUBLICATIONS

Tranversing Data Chucks with Callbacks, IBM Technical Disclosure Bulletin, vol. 36, No. 6A, Jun. 1, 1993, p. 203.

Sarah Harris, et al., Software Links Math Chip to 6800–Family Ps, EDN Electrical Design News, vol. 31, No. 2, Jan. 1986, pp. 175–192.

* cited by examiner

METHOD AND APPARATUS FOR MULTIPLATFORM STATELESS INSTRUCTION SET ARCHITECTURE (ISA) USING ISA TAGS ON-THE-FLY INSTRUCTION TRANSLATION

BACKGROUND OF THE INVENTION

This invention relates to a system, implemented in a computer processing unit, for executing instructions that comply with multiple, different instruction set architectures (ISA's), and in particular to a processing unit that statelessly executes such instructions from different ISA's.

A number of multiple-ISA platforms have been proposed which can accommodate different types of instructions by either binary translation or emulation. When binary translation is used, instructions that comply with a given instruction set architecture B (e.g. for x86 processors) can be executed on a second instruction set architecture A (e.g. in compliance with the ISA for SPARC/IEEE Standard 1754 processors) by first being binarily translated into instructions that ISA A understands. They are then executed just as if they were originally written for ISA A.

This approach entails considerable overhead, in that the entire program for ISA B must first be binarily translated before any of it can be run on the ISA-A processor. This not only involves a delay before the user can process the instructions, but ties up the processing of instructions, making the target processor unavailable until the binary translation is complete. Furthermore, the user may need only a small portion of the code being translated at a given time, making it highly inefficient to have to translate the entire code before accessing that portion.

In addition, binary translation involves the copying of the original instructions, which may or may not be allowable by the user's license or by the law of the region where the user is executing the translation. Moreover, the translated instructions must be stored, so that the user is forced to save two copies of the code. If the translated copy is disposed of, then in order to use the code at a later time, it must again be translated to run on the ISA-A processor.

Another approach to executing code written for ISA B on a system using ISA A is emulation, which may be either software emulation or hardware emulation. Software emulation involves inputting instructions that the processor for ISA A would not normally recognize, converting them into equivalent ISA-A instructions, and executing the equivalent instructions in the A processor. This is done by setting the mode of the A processor to emulate ISA B, executing the ISA-B instructions, and then resetting the A processor back to mode A, i.e. for the native ISA.

The mode change is accomplished by a special program that instructs the processor (or the software emulation program) to interpret a succeeding block of data (until resetting of the mode) as ISA-B instructions, e.g. telling a SPARC processor that the forthcoming block of data actually comprises x86 instructions. The SPARC processor then interprets each data word, one by one, as an instruction. When the block of data has been so executed as instructions, the mode-setting program resets the processor mode to the its native (e.g. SPARC) mode.

While ISA-B instructions can successfully be executed this way, it is an inefficient and time-consuming approach, particularly for short sections of code where the overhead of mode changes becomes significant, and does not allow ISA-A and ISA-B instructions to be intermixed in a block of code; that is, the mode of the A processor must be reset every time code for a different ISA is encountered, which involves considerable cycle-time overhead. This is especially so when, during the execution of ISA-B code in processor A, an interrupt is received that requires the execution of a native ISA-A instruction. In this case, the ISA-A instruction must be trapped, interrupting the ISA-B code execution, and system checks whether it is in the correct mode; and since it is not, the mode must be reset to mode A. The trapped instruction is then executed, and the system then resets back to mode B to resume execution of the ISA-B code. This consumes an inordinate number of cycles.

Hardware emulation can run faster than software emulation, using one or more dynamic decode units (which may be an integral part of the native processor, or may be in an add-on module). Conventional hardware emulation, like software emulation, also uses a mode-setting program, so that the processor knows what type of ISA is to be emulated by a given set of instructions, and sends the instructions to the appropriate dynamic decode unit. Though there is a speed-up in execution, the overhead inefficiencies of mode resetting, trapping and interrupting are the same as for software emulation.

Another approach to accommodating multiple instruction set architectures involves incremental compilation, namely the compiling of portions of a program at a time. This has the advantage that an entire program needn't be compiled when only a piece of it is needed, and in a given setting may save considerable compilation time. It has the distinct disadvantage that it does not efficiently handle self-modifying code, since whenever the code is modified it must be recompiled.

In a loop, where the same instructions are executed repeatedly, either software or hard: ware emulation leads to recompiling the same block of code many times over, since the emulation procedure interprets each command anew when it is encountered. Incremental compilation can lead to the same repetition of compiling, when code self-modification occurs. This repetition of compilation is extremely wasteful of processor cycles.

With the continued development of multiple instruction set architectures in the market—such as the SPARC, x86 and PowerPC ISA's and their respective operating systems (Solaris, DOS, MacOS)—it is becoming ever more important that users be capable of executing applications developed for these different instruction set architectures on a single hardware platform, in a manner that does not involve compilation of unneeded blocks of instructions, inefficient multiple compilation of instructions, or the overhead associated with mode setting. Particularly useful would be a system that not only efficiently accommodates multiple instruction set architectures, but can make use of the best of the many programs written for different ISA's by allowing the intermixing of procedures with instructions from different instruction sets.

SUMMARY OF THE INVENTION

The present invention allows the execution of instructions designed for multiple, normally incompatible instruction set architectures in a single new unified architecture. Instructions for a given 32-bit architecture are coupled to an additional 32-bit word containing a predetermined block of bits constituting an ISA tag indicating the native ISA for the "visiting" code, i.e. the 32-bit instruction set architecture for which the code was written. The entire 64-bit instruction stream is received by the "home" processor, which executes each instruction according to its ISA tag.

The home processor thus utilizes a 64-bit instruction set architecture, and in the foregoing manner can execute instructions from any 32-bit architecture, in real time without recompilation or software emulation. In addition to reducing overhead relative to previous methods, this allows for a programmer to freely make use of subroutines, software modules and objects from multiple ISA's in a single application by simply tagging each imported block of code appropriately. The present invention is particularly suited to a VLIW (very long instruction word) architecture, by which a true stateless multi-ISA system is achieved.

DESCRIPTION OF THE PREFERRED EMBODIMENTS

Figure 1:
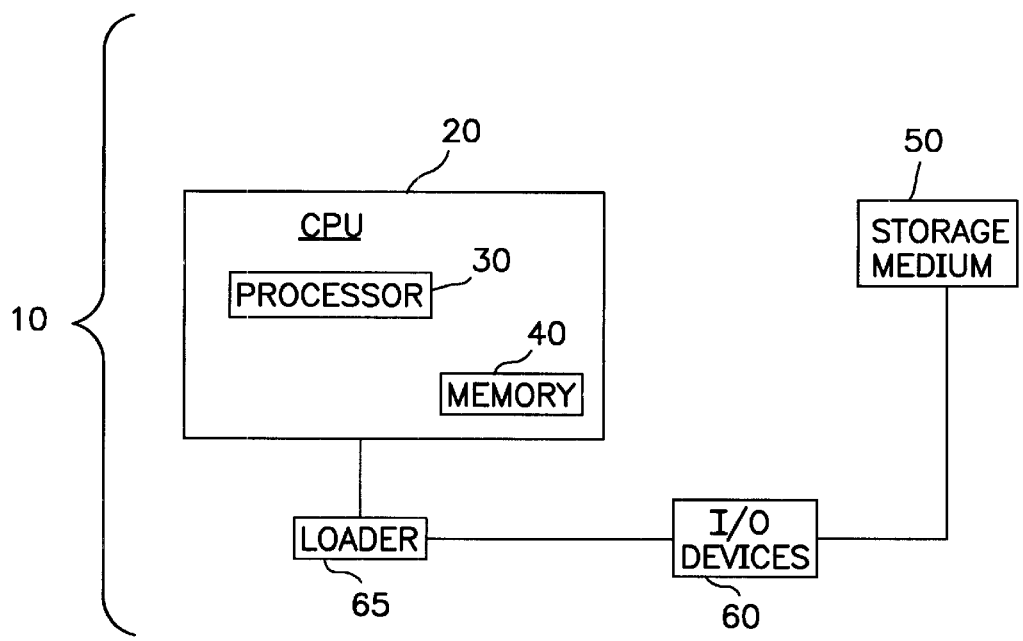
FIG. 1 is a block diagram of a computer system in which the present invention may be implemented.

The system of the present invention is designed to be implemented in existing computer systems, such as the system 10 shown in FIG. 1, including a central processing unit (CPU) 20 having a processor 30 and a memory 40. One or more storage media such as storage medium 50 will normally be used, e.g. disk or tape drives, CD-ROM, etc. I/O devices 60 are coupled to the CPU 20 via an instruction loader 65, and may include such input/output peripherals as a keyboard, monitor, mouse, and so on. Thus, except as described below, conventional hardware may be used to implement the system of the present invention.

The current invention is described herein in an embodiment for statelessly executing instructions written for multiple, different instruction set architectures on a single platform, and in particular for executing 32-bit instructions on a 64-bit platform. It is equally applicable to the execution of any set of instructions, even different sets of different original sizes, on the single platform using instructions of greater length than the original, non-native instruction set architecture(s). The invention is best implemented in an operating system stored in the memory 40, namely in the form of control instructions, series of instruction, or program modules that include one or more control instructions, that are stored in the memory for carrying out the method steps described below. "Control modules" refers herein to any program, set of instructions, program routine, etc., that is configured to carry out one or more of the steps of the invention. (See FIG. 7.)

Figure 2:
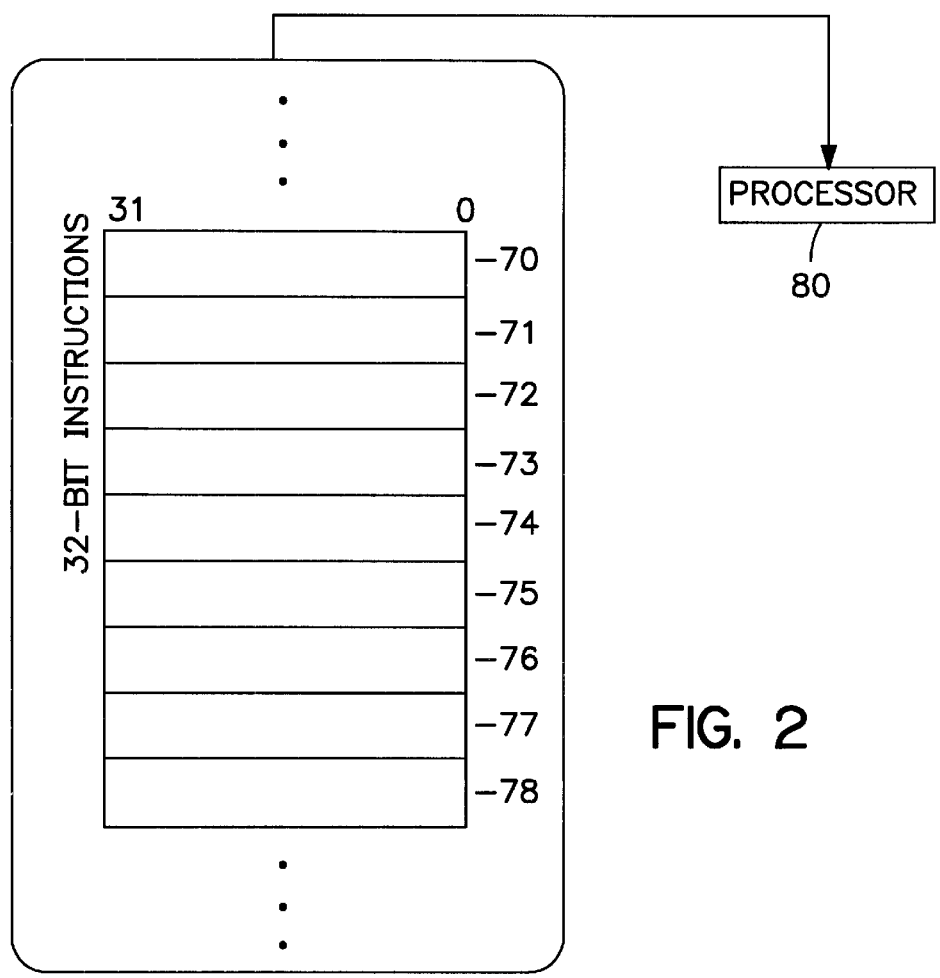
FIG. 2 is a diagram indicating flow of 32-bit instructions into a processor.

FIG. 2 illustrates the flow of control instructions, series of control instructions, or program modules each including one or more control instructions which are 70–78, in this case 32-bit instructions, into a processor 80. As described above, there are a number of different ways of executing these instructions if they were not written for the native ISA of the processor 80. The dots above and below the instructions 70–78 indicate that there will typically be many more instructions in a given program, routine, or the like.

Figure 3:
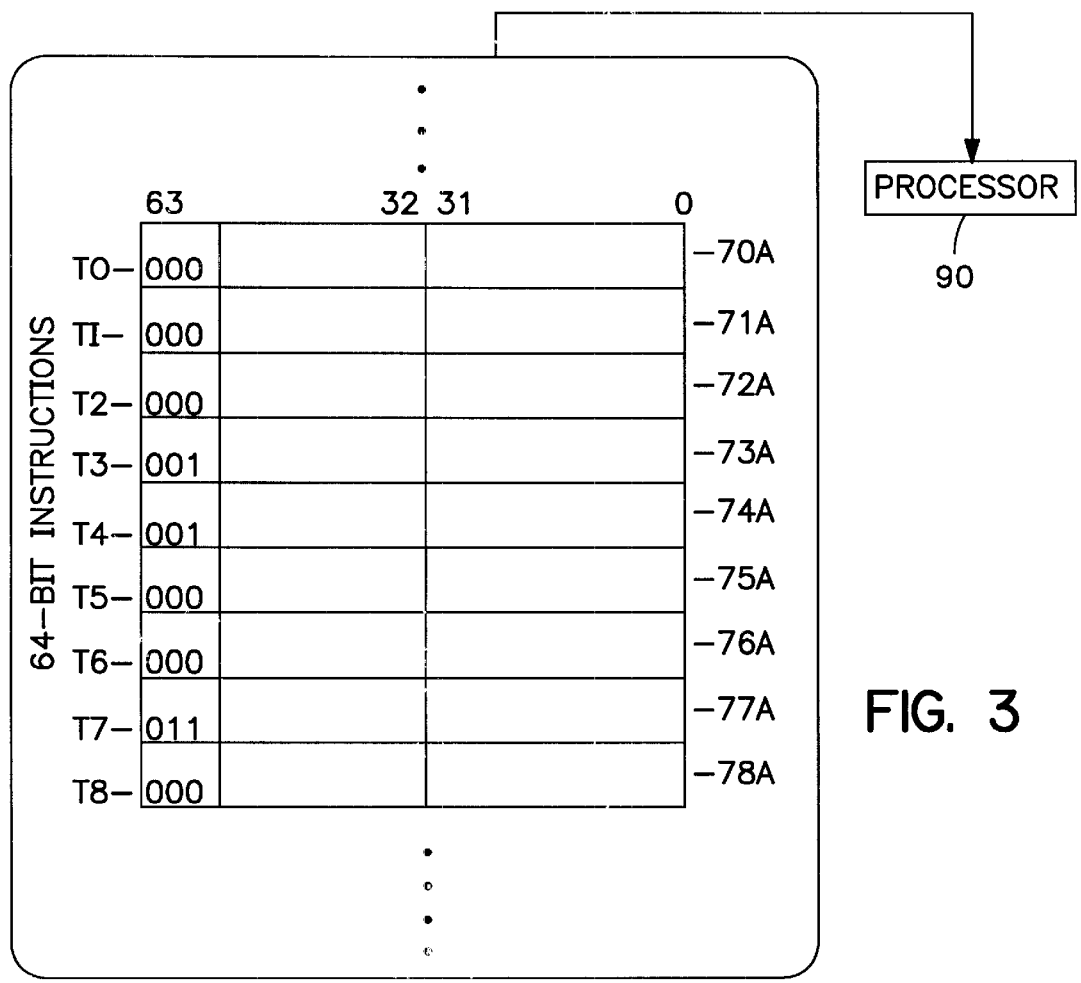
FIG. 3 is a diagram indicating flow of 64-bit instructions of the current invention into a processor.

FIG. 3 illustrates the flow of instructions 70A–78A, which are modified versions of instructions 70–78, into a processor 90 of the invention. Each instruction has been appended with an additional 32 bits, indicated in FIG. 3 as bits 32–63. As an exemplary implementation, the top three bits (or other desired number of bits) may constitute a tag indicating the native ISA for each instruction. Three bits will identify eight different instruction set architectures, so the number of bits for the tags T0–T8 (corresponding to instructions 70A–78A, respectively) may be varied depending upon how many instruction set architectures are to be accommodated.

Figure 4:
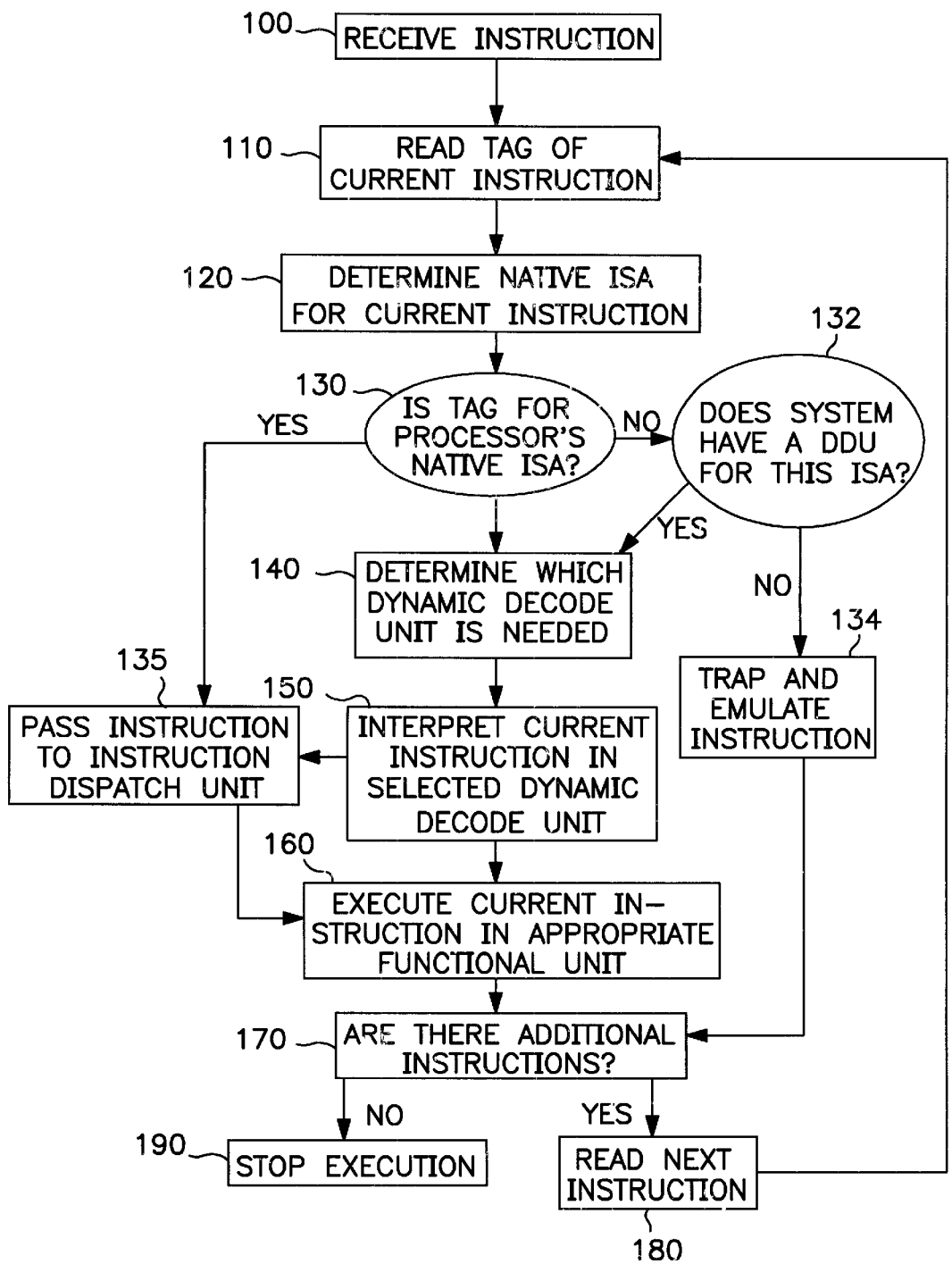
FIG. 4 is a flow chart illustrating the preferred method of the invention.

When an instruction is received by the processor 90, as at box 100 in FIG. 4 (and see FIG. 5), it is received into an instruction router 205, which routes directly to an instruction dispatch unit 200 if it is for the native ISA (such as VLIW in the present example). If the incoming instruction is an instruction relating to one of a number of predetermine ISA's for which a Dynamic Decode Unit (DDU) is available, it is routed by the instruction router 205 to the appropriate DDU for conversion into an instruction that can be recognized by the instruction dispatch unit 200. In either case, the instruction is then sent on to an appropriate functional unit (280, etc.) for execution. The functional units (of which there are three here for illustration, but maybe an arbitrary number) include the floating point unit, fetch unit, branch unit, arithmetic unit, etc.

The correct routing of incoming instructions is accomplished as follows. When an instruction is received at the router 205, the corresponding tag is read to determine the native ISA for the instruction (see boxes 110 and 120). The tags have preassigned meanings. For instance, 000 may refer to the native processor's ISA, for which no translation is necessary to be executed by the processor 90. Table 1 gives an exemplary coding scheme:

TABLE 1

| Code | Native Processor |
|------|------------------|
| 000  | VLIW             |
| 001  | SPARC            |
| 010  | PowerPC          |
| 011  | x86              |
| 100  | (Processor 5)    |
| 101  | (Processor 6)    |
| 110  | (Processor 7)    |
| 111  | (Processor 8)    |

When instruction 70A is received by the processor 90 (see FIGS. 3 and 5), it determines that the instruction is, in this example, a native VLIW instruction, i.e. was coded for the VLIW processor of the system. See box 130 of FIG. 4. Instruction 70A is accordingly routed by router 205 to the instruction dispatch unit 200 (see FIG. 5), as indicated at box 135 of FIG. 4, and is sent to the appropriate functional unit 280, 290 or 300 for execution (box 160).

The system then determines whether there are additional instructions (box 170), and if there are, the next instruction is read (box 180), and the method returns to step 110, where that next instruction's tag is read.

The next instruction at this point is instruction 71A, which is determined to be coded for the native VLIW processor, so it is executed in the same fashion as instruction 70A. This is also done for instruction 72A, and then instruction 73A is encountered, and its tag is read as above at step 110.

At step 120, it is determined that the native ISA for instruction 73A is Sun Microsystems, Inc.'s SPARC ISA, so the method proceeds to step 132, where it is determined whether the system includes a DDU for the identified ISA. If the answer is positive, then the method proceeds to step 140. If not, then the method proceeds to step 134, where it is trapped and emulated in a software emulation step.

In the present example, assuming an appropriate DDU is present in the system, the instruction is sent by the router 205 to the appropriate dynamic decode unit 210–270. For one native and seven "non-native" processors accommodated by a three-bit tag, there will be a possible seven dynamic decode units (DDU's). If the implementation has fewer than seven dynamic decode units, then the remaining ISA's may be trapped and emulated in software, thus allowing an effective trade-off between hardware execution speeds and economy of on-chip resources. This feature is further discussed below.

The function of the DDU's is to convert the incoming instructions into instructions that are recognizable by the native processor 90. This involves translating instructions one-to-one from the non-native ISA to the native ISA (which can be done by a look-up table); converting complex instructions into several native ISA instructions (e.g., complex x86 instructions may translate into several VLIW instructions); implementing condition codes of the non-native ISA as native-ISA condition codes; and so on. Those skilled in the art of developing applications for different ISA's will be able to straightforwardly implement these DDU's.

Figure 7:
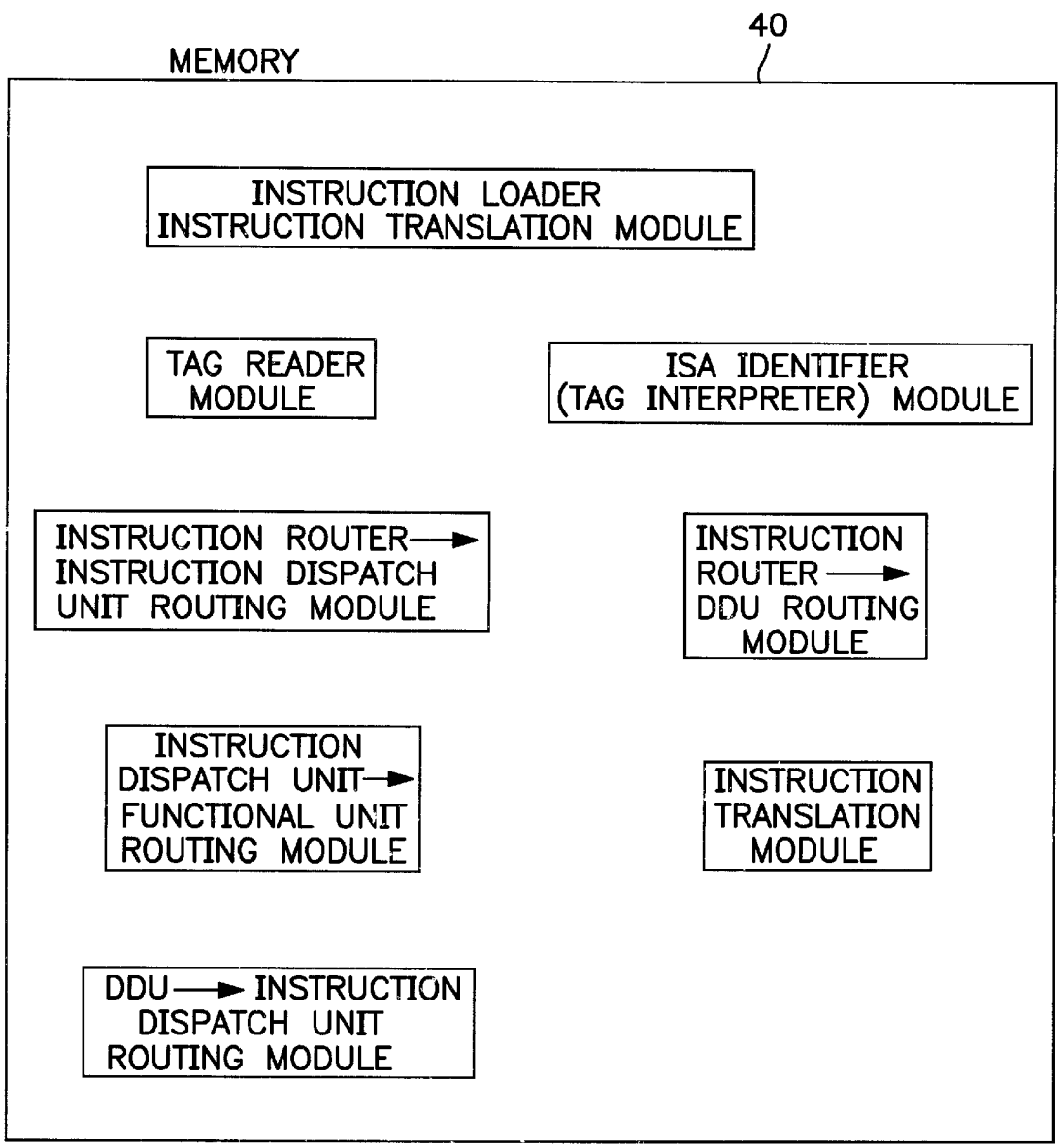
FIG. 7 is a block diagram depicting instruction control modules for a preferred embodiment of the invention.

The functions and steps carried out in the present invention may, as discussed above, be conveniently implemented as discrete, interacting instruction control modules stored in the memory 40 (See FIG. 7). The functions of the modules shown in FIG. 7 will be clear from the discussion below. Several modules may be combined into a single module, and other modules may be included as necessary for any discretely identifiable functions of the invention.

Figure 5:
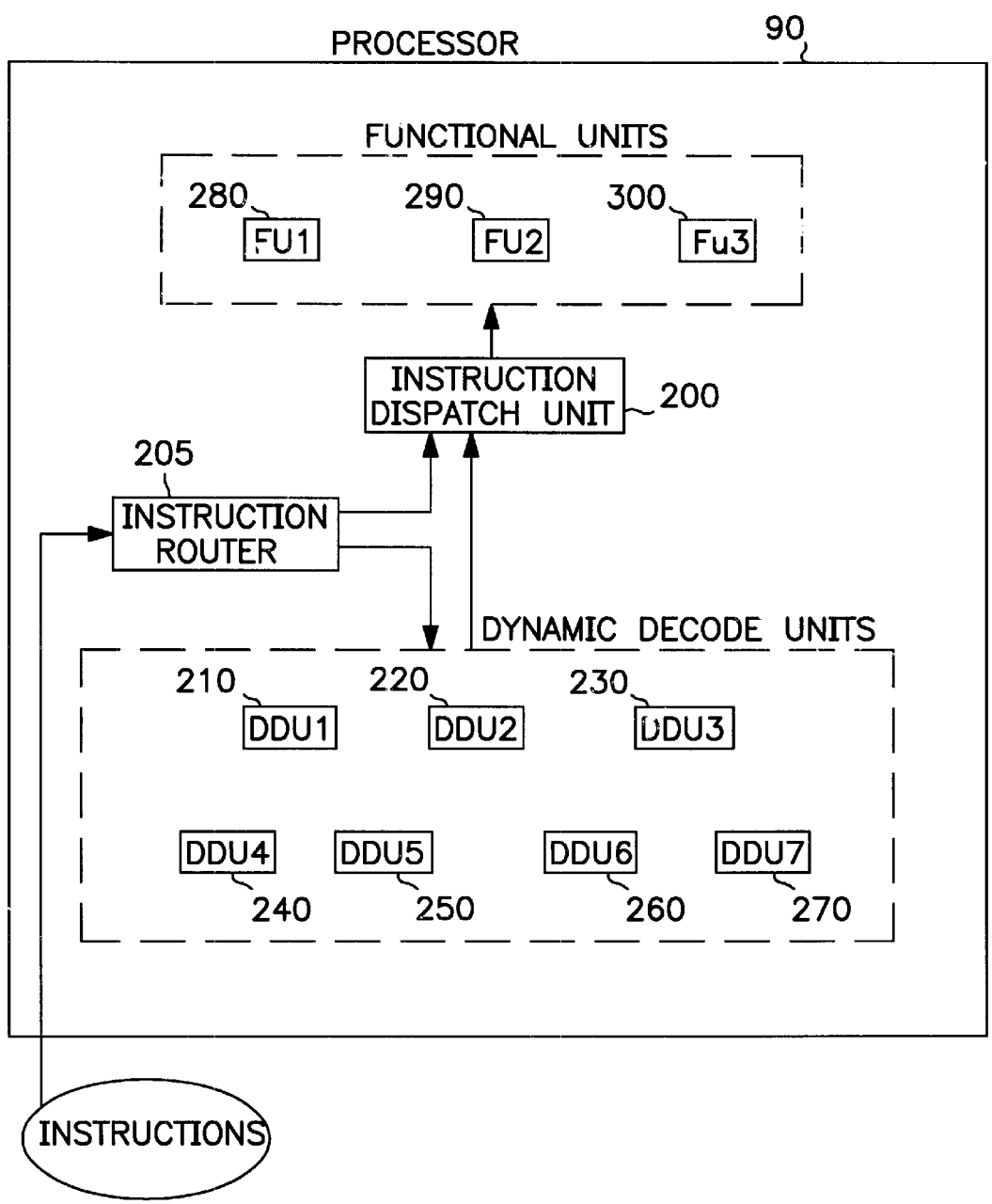
FIG. 5 is a block diagram depicting the dynamic decode units and functional units in a processor for implementing the present invention.

Thus, at box 140 of FIG. 4 it is determined that instruction 73A should be sent to the appropriate DDU, such as DDU1 (item 210 in FIG. 5). The sending of the instruction to DDU1 and interpretation therein are represented in box 150 of FIG. 4. DDU1 which translates the instruction into one or more VLIW instructions, and passes it (or them) on to the instruction dispatch unit 200 (FIG. 5), as indicated at box 135 in FIG. 4. The dispatch unit 200 passes the instruction(s) on as necessary to the appropriate functional unit for execution (box 160).

At box 170 it is found that there is an additional instruction in the instruction stream, so the method proceeds to step 180, where instruction 74A is read. Its tag is read at box 110, and again it is found to be a SPARC instruction, i.e. it is determined from its tag "001" (see FIG. 3) that it should be sent to DDU1.

The next two instructions 75A and 76A are native VLIW instructions (having codes "000"), and are accordingly passed by instruction router 205 to the instruction dispatch unit 200. Instruction 77A is found to pertain to an x86 processor (see Table 1 above), by virtue of its tag "110", and thus is sent by the router 205 to the appropriate DDU, e.g. DDU3 (item 230 in FIG. 5).

Instruction 78A is found again to be a native VLIW command, so is routed directly to the dispatch unit 200 (see FIG. 5). Succeeding instructions are each treated in the same fashion.

It can be seen that the system provides a truly stateless manner of dynamically (in real time) executing instructions originating from code authored for an arbitrarily large number of instruction set architectures. This allows a programmer to write applications in a very flexible manner, using routines, modules and objects from a wide variety of ISA's in a single application, on a line-by-line basis if desired. There is no processing penalty at execution time for doing so, and there is no overhead involved in either precompilation or mode setting.

The instruction router 205, instruction dispatch unit 200, DDU's 210–270 and functional units 280–300 in FIG. 5 would typically be an integral part of the processor 90. However, any of these may be designed to be a separate element, depending on the user's selected system architecture. In general, these may be referred to herein as hardware modules "coupled to" the processor, whether they are an integral part of the processor or, in any particular case, a module separate from the main processor. As discussed below, the router 205 and units 200–300 all are controlled by instructions or instruction modules stored in memory, that are used to receive, inspect, route, convert and otherwise manipulate incoming instructions as necessary.

The DDU's shown in FIG. 5 may be integral to the processor, as shown, or may be plug-in modules that can be added on later. Thus, the system of the invention may first be configured to accommodate a given number of ISA's, and later instruction set architectures may be accommodated by adding on modules and reconfiguring the native system's ISA accordingly.

As alluded to above, the system of the invention may be combined with conventional system for maximum flexibility. For instance if it is desired to execute code for a given ISA for which no DDU is available, then for that code conventional software emulation may still be used—as represented by boxes 132–134 in FIG. 4, where conventional software emulation is carried out for instructions for which no DDU is available to the system. The input code may accordingly include blocks of instructions for a given ISA that is to be software-emulated, while the remainder of the instructions may be as described above, appended with tags to indicate their native ISA's. Likewise, binary translation or hardware emulation could be used in conjunction with instructions that are otherwise configured to take advantage of the present invention, though the latter is less likely since, if a DDU is available for a given ISA, it is a straightforward matter to use it in an implementation of the invention, as described above.

Figure 6:
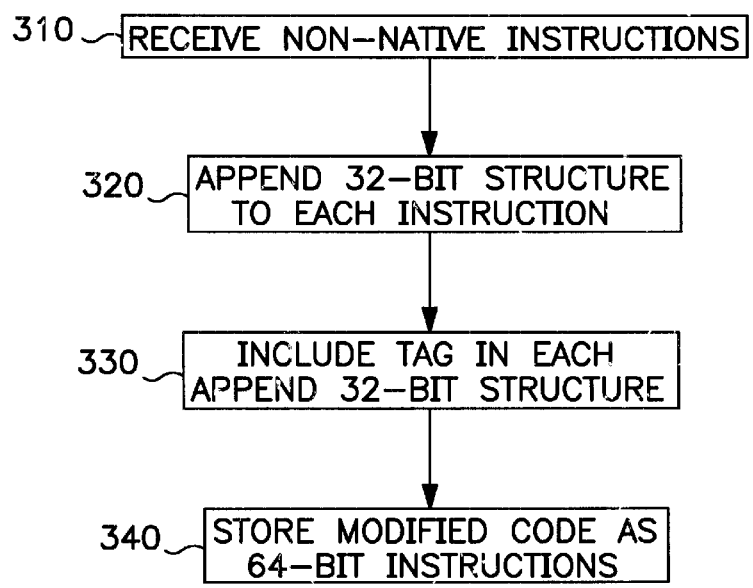
FIG. 6 is a flow chart illustrating a method for converting a block of conventional instructions into instructions for execution according the present invention.

FIG. 6 illustrates a method for converting a block of instructions for a given ISA into instructions conforming to the structure depicted in FIG. 3, suitable for execution on the system of the invention. This method is carried out; by instructions stored in the memory of the computer system and executed by means of the loader 65 shown in FIG. 1.

The non-native instructions are received at step 310 (see FIG. 6) into the loader 65, which is provided with information as to which ISA the instructions were authored for. To each instruction is appended the 32-bit structure (bits 32–63) shown at the left of the instruction stream shown in FIG. 3 (step 320), including the appropriate tag in each case for the non-native ISA (step 330). The instructions are thereby modified and converted into 64-bit instructions, and at step 340 are stored in their modified form. The instructions may now be executed in the above-described manner.

When such blocks of non-native code are converted and executed, correct addressing is automatically accommodated by the system of the invention. In FIG. 2, instruction 70 may be at address "n", instruction 71 at address n+4

(assuming 8-byte words), and so on. After conversion, the instructions have the structure shown in FIG. 3, and now converted instruction 70A has (VLIW) address "n", but instruction 71A has address n+8 instead of n+4, instruction 72A has address n+16 instead of n+8, and so on. This could present a problem, especially when relative addressing is used, so the system of the invention is provided with a mechanism to hide the additional address space occupied by the 64-bit instruction set, while translating instructions from the 32-bit instruction set. This can be accommodated by allowing each address to identify two bytes instead of one byte. This would be visible to the native ISA, but the visiting ISA would not be aware that there were more bytes of storage identified by each address, thus hiding the high-order 32 bits of the 64-bit instruction field from it.

The original, non-native code, once modified as described relative to FIG. 6, does not need any additional modification to execute correctly. For a given addressing scheme, it is a straightforward matter to generate the necessary code for converting the addresses appropriately for the system of the invention; for instance, in the present example, the previous addresses having values (n+Z), where Z is an offset of 0, 4, 8, 12 etc., are converted into addresses having values (n+2*Z), i.e. the offsets are doubled to 0, 8, 16, 24 and so on.

It will be appreciated that the aforementioned problem of executing self-modifying instructions on a non-native platform is solved by the present invention, since all instructions are executed almost as native instructions are, by first being converted in real time by the DDU's. Thus, any code modifications are automatically accommodated, with no recompilation or other overhead encountered by binary translation or emulation.

The additional space taken up by these 64-bit instructions will increase the amount of memory bandwidth and space taken up in the instruction cache. However, this is not likely to be a problem, since the VLIW processor needs a much larger than 32-bit instruction anyway to provide access to a larger register file and instruction encodings, and the temporal and spatial locality exhibited by instructions will keep the vast majority of instruction references to the on-chip cache instead of using up additional bandwidth to memory. Thus, there should not be any appreciable increase in cache misses due to the increased instruction size of the present invention, while considerable cycles are saved by the direct multi-ISA system.

What is claimed is:

1. A system for executing first instructions and second instructions in a computer system including a processor, a memory coupled to said processor and storing a plurality of control modules comprising program instructions for manipulating said first and second instructions, the first and second instructions being configured according to first and second predetermined instruction set architectures (ISA's), respectively, where the first ISA is a native ISA for said processor and the second ISA is a non-native ISA for the processor, the system including:

an instruction router coupled to the processor for receiving said first and second instructions;

an instruction dispatch unit coupled to said instruction router for receiving said first instructions and said second instructions;

at least one dynamic decode unit coupled to said instruction router and to said instruction dispatch unit for receiving said second instructions, configured to translate said second instructions into native instructions before said second instructions are processed by said instruction dispatch unit;

an ISA tag coupled to each instruction in said first and second instructions, identifying the corresponding ISA for that instruction;

a tag reading control module for reading each said ISA tag of said first and second sets of instructions;

a tag identification control module for determining the ISA corresponding to each said ISA tag:

a first routing control module for routing at least some said instructions having; an ISA tag corresponding to the processor's native ISA to said instruction dispatch unit;

a second routing control module for routing at least some said instructions having an ISA tag corresponding to said predetermined non-native ISA to said dynamic decode unit;

a translation control module for translating instructions received at said dynamic decode unit into modified instructions corresponding to said native ISA for said processor;

an instruction emulation control module for emulating a second predetermined ISA that is non-native to said processor and for which a corresponding dynamic decode unit is not present in said system; and wherein each dynamic decode unit is configured to execute, as appropriate, the function of converting a complex non-native instruction into a plurality of native ISA instructions.

2. The system of claim 1, further including a third routing control module for passing said modified instructions to said instruction dispatch unit.

3. The system of claim 1, further including:

at least one functional unit coupled to said instruction dispatch unit for receiving instructions therefrom and for executing said instructions; and a fourth routing control module for passing instructions received at said instruction dispatch unit to said functional unit.

4. The system of claim 1, further including:

an instruction loader coupled to said instruction router, a loader control module for converting at least some said second instructions into a format including said ISA tag.

5. The system of claim 4, wherein said loader control module further includes instructions for appending at least one additional bit to each of a plurality of said second instructions, said additional bit comprising said ISA tag.

6. A method for executing instructions on a computer system having a processor, a memory coupled to said processor, at least one functional unit coupled to said processor, at least one dynamic decode unit coupled to said processor, and control program modules stored in said memory for manipulating said instructions, the instructions corresponding to a first predetermined instruction set architecture (ISA) that is non-native to said processor, the method including the steps of:

receiving at least one said instruction at said processor, said instruction including a tag indicating whether it corresponds to a native ISA or a non-native ISA;

inspecting said instruction to determine whether it corresponds to a native ISA for said processor, and if so then passing said instruction to said functional unit for execution;

if said inspected instruction relates to said first predetermined non-native ISA then converting said inspected instruction into a modified instruction corresponding to said native ISA;

if said inspected instruction corresponds to a second predetermined ISA that is also non-native to said processor and a corresponding dynamic decode unit is not present in said system, then emulating said inspected instruction;

passing said modified instruction to said functional unit for execution; and wherein the converting step includes, as appropriate for a received instruction, the step of converting a complex non-native instruction into a plurality of native ISA instructions.

7. The method of claim 6, further including, before said receiving step, the step of:

converting at least one said instruction into a format corresponding to said native ISA to identify said instruction as corresponding to said non-native ISA.

8. The method of claim 7, wherein:

the converting step includes the step of appending at least one additional bit to at least one said instruction, said at least one additional bit comprising an ISA identifier tag.

9. The method of claim 8, wherein said inspecting step includes the steps of:

reading said ISA identifier tag; and determining to which ISA said identifier tag corresponds.

10. The method of claim 6, wherein said emulating step comprises software emulation.

11. A system for executing instructions in a computer system including a processor, a memory coupled to said processor and storing a plurality of control modules comprising program instructions for manipulating said instructions, said instructions being configured according to at least one of first and second predetermined instruction set architectures (ISA's), where the first ISA is a native ISA for said processor and the second ISA is a predetermined non-native ISA for the processor, the system including:

an instruction router coupled to the processor for receiving said instructions;

an instruction dispatch unit coupled to said instruction router for receiving at least a first subset of said instructions directly;

at least one dynamic decode unit coupled to said instruction loader and to said instruction dispatch unit for receiving at least a second subset of said instructions;

an ISA tag coupled to each of a plurality of said instructions, identifying a native ISA for each of said plurality of instructions;

an ISA identification control module for determining for each of said plurality of instructions the native ISA for that instruction, based upon said ISA tag;

a routing control module for routing at least some of said first subset of instructions to said instruction dispatch unit and for routing at least some of said second subset of instructions to said dynamic decode unit;

a dynamic decode unit control module for converting instructions received at said dynamic decode unit into modified instructions corresponding to said native ISA for said processor for inputting to said instruction dispatch unit, the dynamic decode unit being configured to convert a complex non-native instruction into a plurality of native ISA instructions; and an instruction emulation control module for emulating a second predetermined ISA that is non-native to said processor.

12. The system of claim 11, wherein:

said first subset of instructions correspond to a format relating to said native ISA for said processor; and said second subset of instructions correspond to a format relating to said predetermined non-native ISA.

13. The system of claim 11, wherein said dynamic decode unit control module includes control instructions for routing said modified instructions to said instruction dispatch unit.

14. The system of claim 11, further including:

a plurality of functional units coupled to said instruction dispatch unit; and an instruction dispatch unit control module for routing instructions received at said instruction dispatch unit to at least one said functional unit for execution.

15. The system of claim 11, wherein said ISA identifier comprises a tag including at least one bit appended to each of said plurality of said instructions.

16. The system of claim 11, further including:

an instruction loader coupled to said processor for receiving said instructions for input to and execution by said processor;

an instruction conversion control module for converting each of a plurality of said instructions to a format corresponding to said native ISA for said processor.

17. The system of claim 16, wherein said instruction conversion module includes conversion instructions for appending to each of said plurality of said instructions a field containing an ISA identifier tag.

18. The system of claim 2, wherein said instruction emulation control module comprises instructions for software emulation of commands of said second predetermined ISA.

19. A computer system for executing instructions for a plurality of different instruction set architectures (ISA's), including:

a processor;

a memory coupled to said processor and storing a plurality of control modules comprising program instructions for manipulating said instructions, said instructions being configured according to at least one of first and second predetermined ISA's, where the first ISA is a native ISA for said processor and the second ISA is a predetermined non-native ISA for the processor, the system including:

an instruction router coupled to the processor for receiving said instructions;

an instruction dispatch unit coupled to said instruction router for receiving at least a first subset of said instructions directly;

at least one dynamic decode unit coupled to said instruction loader and to said instruction dispatch unit, for receiving at least a second subset of said instructions;

an ISA tag coupled to each of a plurality of said instructions, identifying a native ISA for each of said plurality of instructions;

an ISA identification control module for determining for each of said plurality of instructions the native ISA for that instruction, based upon said ISA tag;

a routing control module for routing at least some of said first subset of instructions to said instruction dispatch unit and for routing at least some of said second subset of instructions to said dynamic decode unit;

a dynamic decode unit control module for converting instructions received at said dynamic decode unit into modified instructions corresponding to said native ISA for said processor for inputting to said instruction dispatch unit, the dynamic decode unit being configured to convert a complex non-native instruction into a plurality of native ISA instructions, and an instruction emulation control module for emulating a second predetermined ISA that is non-native to said processor.

20. A subsystem for processing instructions of at least one of a first instruction type and a second instruction type in a processor-based system adapted to a first instruction set architecture, where the first instruction type is in a first predefined format corresponding to the first instruction set architecture and the second instruction type is in a second predefined format corresponding to a second instruction set architecture, each instruction to be processed including a tag identifying it as being of the first type or the second type, the subsystem including:

an instruction router configured to receive the instructions and to inspect the tag of each received instruction to identify the instruction as being of the first type or the second type;

a dynamic decode unit coupled to the instruction router and configured to receive therefrom each instruction of the second type, and to convert each such instruction of the second type into at least one instruction of the first type, where the instruction conversion includes, as appropriate, conversion of a single complex instruction of the second type into a plurality of instructions of the first type;

an instruction dispatch unit coupled to the instruction router and to the dynamic decode unit, and configured to receive each instruction identified as being of the first type from the instruction dispatch unit and to receive the converted instructions from the dynamic decode unit, and to forward each received instruction to at least one functional unit of the processor-based system, the functional unit being configured to carry out at least one operation corresponding to a received instruction; and an instruction emulation control module for emulating a second predetermined ISA that is non-native to said processor.

21. The subsystem of claim 20, further configured to process instructions of a third type in a format corresponding to a third instruction set architecture, and further including:

an additional dynamic decode unit coupled to the instruction router and configured to receive therefrom each instruction of the third type, and to convert each such instruction of the third type into an instruction of the first type;

wherein the instruction dispatch unit is further coupled to the additional dynamic decode unit, and is further configured to receive the converted instructions from the additional dynamic decode unit, and to forward each such converted instruction to at least one functional control unit.

22. The subsystem of claim 20, wherein the dynamic decode unit is further configured to translate at least some instructions of the second type into instructions of the first type in a one-to-one fashion.

23. The subsystem of claim 20, wherein the dynamic decode unit is further configured to implement condition codes corresponding to instructions of the second type to condition codes corresponding to instructions of the first type.

24. A method for processing instructions of at least one of a first instruction type and a second instruction type in a processor-based system adapted to a first instruction set architecture, where the first instruction type is in a first predefined format corresponding to the first instruction set architecture and the second instruction type is in a second predefined format corresponding to a second instruction set architecture, each instruction to be processed including a tag identifying it as being of the first type or the second type, the method including the steps of:

receiving each instruction at an instruction router;

inspecting the tag of each received instruction to identify the instruction as being of the first type or the second type;

forwarding each instruction of the second type from the instruction router to a dynamic decode unit, and to convert each such instruction of the second type into at least one instruction of the first type, where the instruction conversion includes, as appropriate, conversion of a single complex instruction of the second type into a plurality of instructions of the first type;

passing each instruction identified as being of the first type the instruction router to an instruction dispatch unit;

passing each converted instruction from the dynamic decode unit to the instruction dispatch unit;

forwarding each instruction received at the instruction dispatch unit to at least one functional unit of the processor-based system, the functional unit being configured to carry out at least one operation corresponding to the forwarded instruction; and if the instruction corresponds:to a second predetermined ISA that is also non-native to said processor and a corresponding dynamic decoder unit is not present in the system, then emulating the instruction.

25. The method of claim 24, wherein the converting step further includes, for at least some such instructions of the second type, conversion of instructions of the second type into instructions of the first type in a one-to-one fashion.

26. The method of claim 24, wherein the converting step further includes converting condition codes corresponding to instructions of the second type into condition codes corresponding to instructions of the first type.

* * * * *